(12) United States Patent
Otani

(10) Patent No.: US 10,516,864 B2
(45) Date of Patent: Dec. 24, 2019

(54) PROJECTOR SYSTEM

(71) Applicant: SEIKO EPSON CORPORATION, Tokyo (JP)

(72) Inventor: Makoto Otani, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/907,818

(22) Filed: Feb. 28, 2018

(65) Prior Publication Data

US 2018/0270460 A1 Sep. 20, 2018

(30) Foreign Application Priority Data

Mar. 15, 2017 (JP) ................................. 2017-049697

(51) Int. Cl.
| | |
|---|---|
| H04N 9/31 | (2006.01) |
| H04N 13/225 | (2018.01) |
| H04N 13/229 | (2018.01) |
| H04N 13/246 | (2018.01) |
| G06F 3/041 | (2006.01) |

(52) U.S. Cl.
CPC ......... *H04N 9/3194* (2013.01); *H04N 9/3179* (2013.01); *H04N 13/225* (2018.05); *H04N 13/246* (2018.05); *G06F 3/041* (2013.01)

(58) Field of Classification Search
CPC .. H04N 9/3194; H04N 9/3179; H04N 13/225; G06F 3/17; G06F 3/041
See application file for complete search history.

(56) References Cited

U.S. PATENT DOCUMENTS

| | | | | |
|---|---|---|---|---|
| 6,259,450 B1 * | 7/2001 | Chiabrera | ............... | G06T 15/10 345/419 |
| 6,329,963 B1 * | 12/2001 | Chiabrera | ............... | G06T 15/10 345/589 |
| 6,803,906 B1 * | 10/2004 | Morrison | ............... | G06F 3/0428 178/18.01 |
| 7,598,942 B2 * | 10/2009 | Underkoffler | ........... | G06F 3/017 345/158 |
| 7,701,439 B2 * | 4/2010 | Hillis | ................... | G03H 1/0005 345/156 |
| 8,370,383 B2 * | 2/2013 | Kramer | ................. | G06F 3/0325 707/769 |
| 8,531,396 B2 * | 9/2013 | Underkoffler | ........... | G06F 3/017 345/158 |
| 8,537,111 B2 * | 9/2013 | Underkoffler | ........... | G06F 3/017 345/158 |
| 8,537,112 B2 * | 9/2013 | Underkoffler | ........... | G06F 3/017 345/158 |

(Continued)

FOREIGN PATENT DOCUMENTS

| | | |
|---|---|---|
| JP | 2012-150636 A | 8/2012 |
| JP | 2015-159524 A | 9/2015 |

*Primary Examiner* — Brian P Yenke
(74) *Attorney, Agent, or Firm* — Oliff PLC

(57) ABSTRACT

Cameras that are four imagers that form an imaging system are so configured as to be capable of acquiring parallax information based on two sets of parallax images that differ from each other in terms of imaging range for acquisition of the parallax information with the inter-camera distance reduced. The acquired parallax information is used to detect a pointing element on an irradiated region that is a projection screen to achieve interactive image projection.

12 Claims, 13 Drawing Sheets

(56) References Cited

U.S. PATENT DOCUMENTS

| | | | | |
|---|---|---|---|---|
| 8,681,098 B2* | 3/2014 | Underkoffler | G06F 3/017 | 345/158 |
| 8,686,943 B1* | 4/2014 | Rafii | G06F 3/017 | 345/158 |
| 8,723,795 B2* | 5/2014 | Underkoffler | G06F 3/017 | 345/158 |
| 8,896,531 B2* | 11/2014 | Minnen | G06F 3/017 | 345/158 |
| 8,941,588 B2* | 1/2015 | Minnen | G06F 3/017 | 345/158 |
| 8,941,589 B2* | 1/2015 | Csaszar | G06K 7/0008 | 345/158 |
| 8,941,590 B2* | 1/2015 | Csaszar | G06F 3/017 | 345/158 |
| 9,075,296 B2* | 7/2015 | Watanabe | H04N 9/317 | |
| 9,075,441 B2* | 7/2015 | St. Hilaire | G06F 3/017 | |
| 9,299,321 B2* | 3/2016 | Ohno | G09G 5/14 | |
| 9,349,180 B1 | 5/2016 | Ramaswamy | G06K 9/4642 | |
| 9,384,551 B2* | 7/2016 | Ramaswamy | G06T 7/85 | |
| 9,471,118 B2* | 10/2016 | Buch | G06F 1/3287 | |
| 9,471,119 B2* | 10/2016 | Dayka | H04L 9/3247 | |
| 9,471,147 B2* | 10/2016 | Underkoffler | G06F 3/017 | |
| 9,495,013 B2* | 11/2016 | Underkoffler | G06F 3/017 | |
| 9,549,174 B1* | 1/2017 | Chavez | H04N 5/247 | |
| 9,727,171 B2* | 8/2017 | Murase | G06F 3/042 | |
| 9,746,966 B2* | 8/2017 | Suzuki | G06F 3/0425 | |
| 9,823,747 B2* | 11/2017 | Underkoffler | G06F 3/017 | |
| 9,838,677 B1* | 12/2017 | Ramaswamy | H04N 13/00 | |
| 9,843,781 B1* | 12/2017 | Furui | H04N 5/232 | |
| 9,910,497 B2* | 3/2018 | Kramer | G06F 3/017 | |
| 9,933,852 B2* | 4/2018 | Kramer | G06F 9/542 | |
| 9,971,807 B2* | 5/2018 | Kramer | G06K 9/00389 | |
| 10,048,573 B2* | 8/2018 | Otani | G03B 9/02 | |
| 10,061,392 B2* | 8/2018 | Underkoffler | G06F 3/017 | |
| 10,209,786 B2* | 2/2019 | Otani | G03B 21/14 | |
| 10,250,859 B2* | 4/2019 | Furui | H04N 5/232 | |
| 2003/0071813 A1* | 4/2003 | Chiabrera | G02B 27/225 | 345/426 |
| 2003/0103047 A1* | 6/2003 | Chiabrera | G02B 27/225 | 345/419 |
| 2004/0246333 A1* | 12/2004 | Steuart, III | G03B 35/08 | 348/36 |
| 2006/0098873 A1* | 5/2006 | Hildreth | G06K 9/00375 | 382/181 |
| 2006/0197756 A1* | 9/2006 | Sun | G06F 3/042 | 345/179 |
| 2006/0210146 A1* | 9/2006 | Gu | G01B 11/25 | 382/154 |
| 2008/0143842 A1* | 6/2008 | Gillard | G03B 37/04 | 348/218.1 |
| 2009/0103780 A1* | 4/2009 | Nishihara | G06F 3/017 | 382/103 |
| 2009/0169095 A1* | 7/2009 | Zhuang | G01B 11/2545 | 382/154 |
| 2010/0050133 A1* | 2/2010 | Nishihara | G06F 3/017 | 715/863 |
| 2010/0318467 A1* | 12/2010 | Porter | H04N 5/2624 | 705/51 |
| 2011/0025603 A1* | 2/2011 | Underkoffler | G06F 3/017 | 345/158 |
| 2012/0019530 A1* | 1/2012 | Baker | G02B 27/2207 | 345/419 |
| 2012/0300044 A1* | 11/2012 | Thomas | H04N 9/3147 | 348/51 |
| 2014/0298269 A1* | 10/2014 | Underkoffler | G06F 3/017 | 715/848 |
| 2014/0300704 A1* | 10/2014 | Ramaswamy | G06T 7/85 | 348/48 |
| 2014/0306939 A1* | 10/2014 | Tamura | G06F 3/0418 | 345/178 |
| 2015/0077573 A1* | 3/2015 | Ishikawa | G06T 3/005 | 348/189 |
| 2015/0208050 A1 | 7/2015 | Pawlak et al. | | |
| 2015/0356739 A1* | 12/2015 | Masuda | G01C 11/06 | 348/47 |
| 2015/0363070 A1* | 12/2015 | Katz | G06F 3/017 | 715/852 |
| 2015/0371083 A1* | 12/2015 | Csaszar | G06K 9/00355 | 382/103 |
| 2016/0191887 A1* | 6/2016 | Casas | H04N 13/296 | 348/47 |
| 2016/0283040 A1* | 9/2016 | Suzuki | G06F 3/0425 | |
| 2016/0323565 A1* | 11/2016 | van Baarsen | G06T 7/593 | |
| 2017/0045947 A1* | 2/2017 | Tarn | G06F 3/017 | |
| 2017/0052254 A1* | 2/2017 | Tateyama | G01S 15/8965 | |
| 2017/0107698 A1* | 4/2017 | Yamaguchi | H04N 7/181 | |
| 2017/0264871 A1* | 9/2017 | Fujiune | H04N 9/3194 | |
| 2017/0339382 A1* | 11/2017 | Furui | H04N 5/232 | |
| 2018/0051982 A1* | 2/2018 | Yin | G01B 11/03 | |
| 2018/0070063 A1* | 3/2018 | Furui | H04N 5/232 | |
| 2018/0088447 A1* | 3/2018 | Otani | G03B 9/02 | |
| 2018/0088688 A1* | 3/2018 | Otani | G03B 21/14 | |
| 2018/0139431 A1* | 5/2018 | Simek | H04N 5/2258 | |
| 2018/0144030 A1* | 5/2018 | Kramer | G06F 17/30477 | |
| 2018/0173313 A1* | 6/2018 | Underkoffler | G06F 3/017 | |
| 2018/0198970 A1* | 7/2018 | Seshadrinathan | H04N 5/2355 | |
| 2018/0211398 A1* | 7/2018 | Schmidt | G06T 7/514 | |
| 2018/0224553 A1* | 8/2018 | Kitagawa | G01S 17/89 | |
| 2018/0250813 A1* | 9/2018 | Shimodaira | G06T 7/75 | |
| 2018/0288401 A1* | 10/2018 | Eshima | H04N 13/246 | |
| 2019/0014295 A1* | 1/2019 | Fujiune | H04N 9/3194 | |
| 2019/0253679 A1* | 8/2019 | Tsubota | G01B 11/25 | |

* cited by examiner

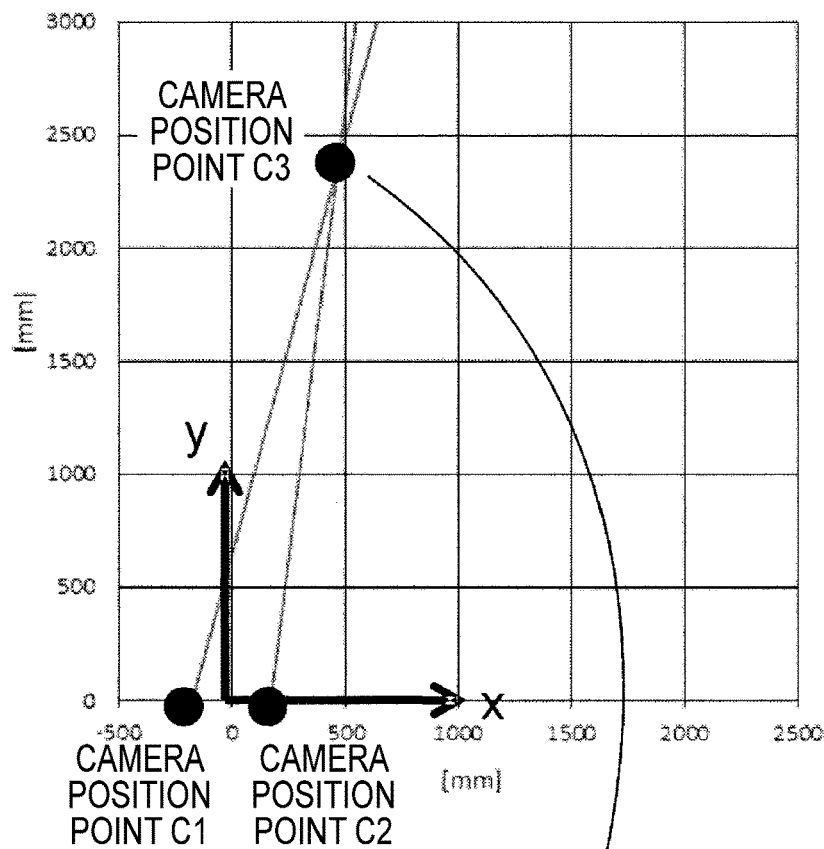
FIG. 9
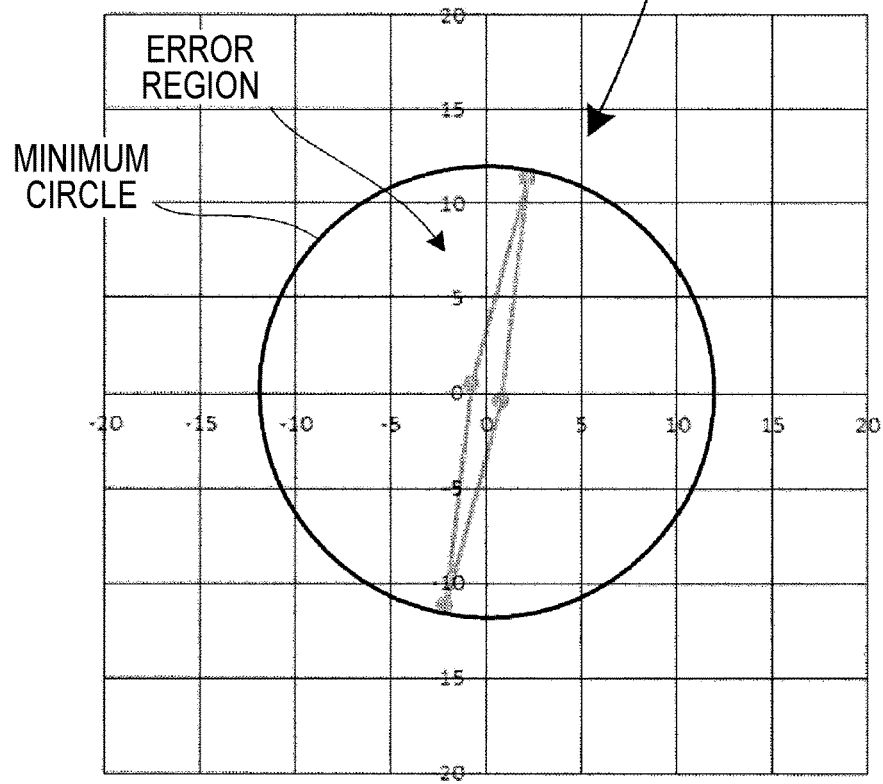

PROJECTOR SYSTEM

BACKGROUND

1. Technical Field

The present invention relates to a projector system capable of detecting a three-dimensional pointing element, such as a finger, on a projection screen.

2. Related Art

As a projector capable of detecting a three-dimensional pointing element, such as a finger, on a projection screen, there is, for example, a known projector that recognizes the shape of the pointing element, such as a finger, based on parallax information from a plurality pieces of captured image information captured with a plurality of cameras to detect a pointed position (see JP-A-2012-150636, for example). Using the pointed position detection allows what is called an interactive projector capable of writing with the written content reflected in the content of a projected image. In the case where the parallax information is used as described above, however, accurate recognition of the shape of the finger requires increase in the amount of parallax, that is, increase in the inter-camera distance, undesirably resulting in a possible large increase in the inter-camera distance as compared with the size of the main body of the projector. As another solution, it is conceivable to improve the performance of the cameras, for example, improve the resolution of the cameras and lens performance, but the cost increases accordingly.

SUMMARY

An advantage of some aspects of the invention is to provide a projector system capable of suppressing an increase in the inter-imager distance while position sensing performed by acquisition of parallax information from captured images is maintained highly accurate.

A projector system according to an aspect of the invention includes a projector main body that projects image light and a first imager, a second imager, a third imager, and a fourth imager that allow two sets of parallax images that differ from each other in terms of imaging range to be captured in a region where the image light from the projector main body is projected.

The projector system described above, in which the four imagers can capture two sets of parallax images (stereo images) that differ from each other in terms of imaging range, allows acquisition of parallax information that allows position sensing with accuracy comparable, for example, to the accuracy with which parallax information is acquired by two imagers with the inter-imager distance reduced. As a result, for example, in the projector system that can achieve interactive image projection by using the parallax information to detect a pointing element on a projection screen, the size of the projector system can be reduced.

According to a specific aspect of the invention, the first imager is disposed in a position separate in a first direction perpendicular to a projection direction of the projector main body from a projection optical axis of the projector main body, the second imager is disposed in a position separate in a second direction opposite the first direction from the projection optical axis, the first and second imagers differ from each other in terms of a distance to the region where the image light from the projector main body is projected, and the first and second imagers capture a set of parallax images. In this case, parallax between the first imager and the second imager is readily obtained, whereby parallax information necessary for the detection of the pointing element on the projection screen can be obtained from the parallax images with increase in the inter-imager distance suppressed.

According to another aspect of the invention, the third imager is disposed in a position separate in the second direction from the projection optical axis, the fourth imager is disposed in a position separate in the first direction from the projection optical axis, the third and fourth imagers differ from each other in terms of the distance to the region where the image light from the projector main body is projected, and the third and fourth imagers capture a set of parallax images different from the set of parallax images captured by the first and second imagers. In this case, parallax between the third imager and the fourth imager is readily obtained, whereby parallax information necessary for the detection of the pointing element on the projection screen can be obtained from the parallax images with increase in the inter-imager distance suppressed.

According to still another aspect of the invention, the first and third imagers are disposed in positions closer to the projection region than the second and fourth imagers. In this case, the difference in the distance to the projection region can be used to allow parallax to be created between the first and third imagers and the second and fourth imagers.

According to still another aspect of the invention, the first to fourth imagers each incline by a tilt angle that falls within a predetermined angular range, the tilt angle of the first imager is greater than the tilt angle of the second imager, and the tilt angle of the third imager is greater than the tilt angle of the fourth imager. In this case, providing the tilt angles allows suppression of increase in the angle of view of the imagers as compared with a case where no tilt angle is provided.

According to still another aspect of the invention, the first and third imagers have the same distance to the region where the image light from the projector main body is projected. In this case, the first and third imagers can perform imaging in the state in which they have the same distance to the projection region.

According to still another aspect of the invention, the second and fourth imagers have the same distance to the region where the image light from the projector main body is projected. In this case, the second and fourth imagers can perform imaging in the state in which they have the same distance to the projection region.

According to still another aspect of the invention, the first to fourth imagers are disposed at four corners of an enclosure that accommodates the projector main body. In this case, arranging the imagers at the four corners of the enclosure allows parallax information based on the parallax images to be efficiently obtained with the projector main body accommodated in the enclosure without the four imagers greatly protruding from the enclosure.

According to still another aspect of the invention, the first and second imagers are disposed in diagonal positions out of four corners of an enclosure that accommodates the projector main body, and the third and fourth imagers are disposed in diagonal positions out of the four corners of the enclosure that differ from the diagonal positions where the first and second imagers are disposed. In this case, the parallax images captured by the first and second imagers can be combined with the parallax images captured by the third and fourth imagers to provide parallax information.

According to still another aspect of the invention, the first and second imagers capture images of at least half the region where the image light from the projector main body is projected, and the third and fourth imagers capture images of at least half the region where the image light from the projector main body is projected, the at least half region containing a remaining region that is not captured by the first and second imagers. In this case, the parallax images can be combined with one another to provide parallax information for detecting the pointing element on the projection screen over the entire region where the image light is projected.

According to still another aspect of the invention, the first and second imagers capture images of at least half the region where the image light is projected, the at least half region containing an edge region on a side in one of the first and second directions, and the third and fourth imagers capture images of at least half the region where the image light is projected, the at least half region containing an edge region on a side in another of the first and second directions. In this case, the first and second imagers capture images of half the image light projection region containing an end region on one side in the direction perpendicular to the projection direction, and the third and fourth imagers capture images of half the image light projection region containing an end region on the other side in the direction perpendicular to the projection direction.

According to still another aspect of the invention, the projector main body obliquely projects the image light. In this case, image projection of a short focal length type in which proximity projection is performed toward an irradiated region, such as a screen, can be performed.

According to still another aspect of the invention, the first to fourth imagers each incline in correspondence with a range over which the imager captures an image of the region where the image light from the projector main body is projected. In this case, the angle of view of each of the imagers can be further narrowed.

According to still another aspect of the invention, the first to fourth imagers capture images of imaging regions containing the region where the image light from the projector main body is projected to allow detection of a pointing element present in any of the imaging regions. In this case, the acquired parallax information can be used to grasp the pointing element as a three-dimensional shape.

According to still another aspect of the invention, the projector system identifies an image projection position based on image light information acquired by the first to fourth imagers and a position of a pointing element detected by the first to fourth imagers and performs image projection that reflects information on the identified position of the pointing element. In this case, interactive image projection that reflects information on the position pointed with the pointing element can be performed.

BRIEF DESCRIPTION OF THE DRAWINGS

The invention will be described with reference to the accompanying drawings, wherein like numbers reference like elements.

FIG. 9 describes the index of the parallax information in an example.

DESCRIPTION OF EXEMPLARY EMBODIMENTS

First Embodiment

A projector system according to a first embodiment of the invention will be described below with reference to the drawings.

Figure 1:
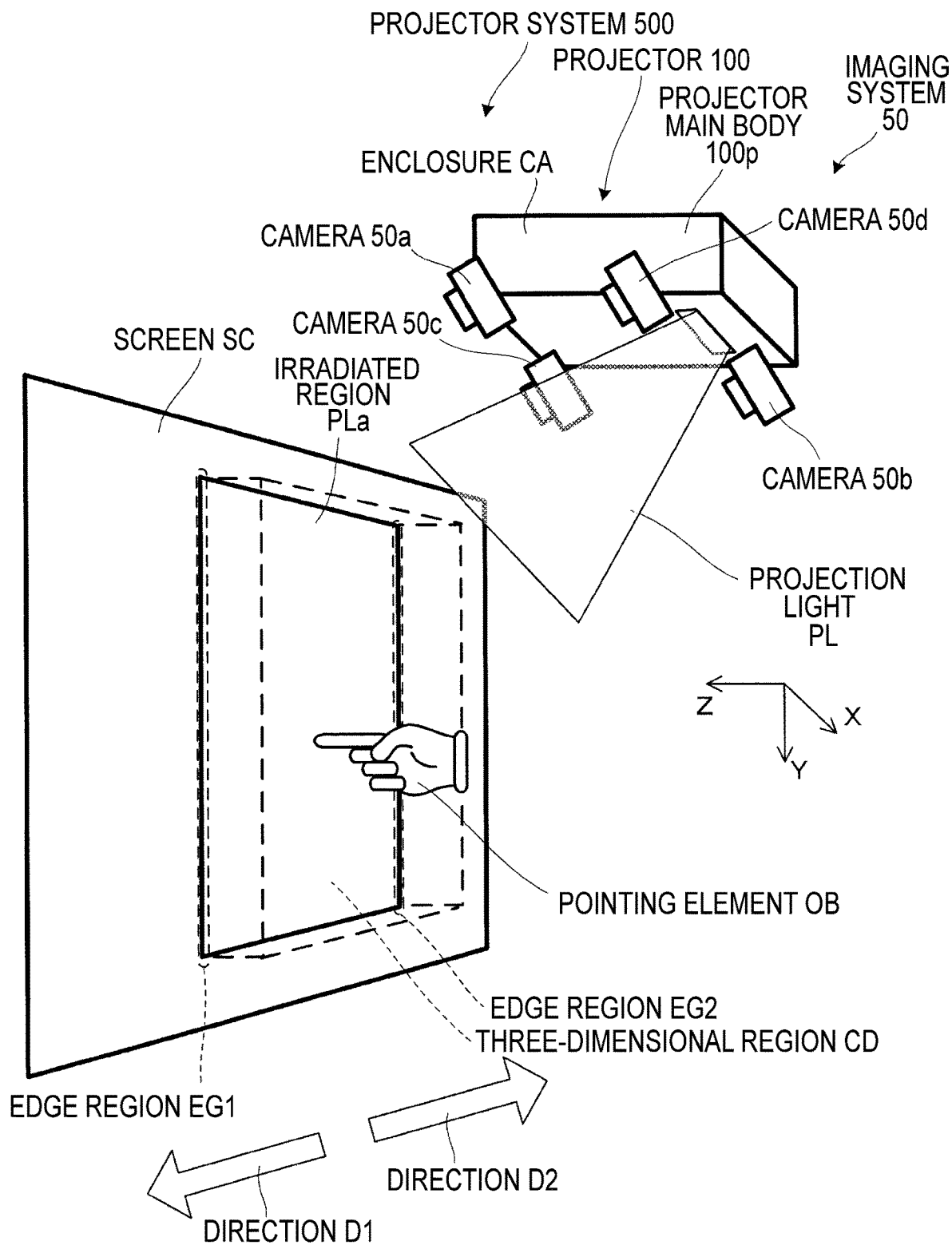
FIG. 1 shows a schematic configuration of a projector system according to a first embodiment.

A projector system 500 shown in FIG. 1 and other figures is formed of a projector 100, which is attached to and hung from a ceiling and projects (obliquely project) projection light PL, which is image light, for image projection. An irradiated region PLa, which is irradiated with the projection light PL, is formed, for example, on a screen SC. The irradiated region PLa corresponds to a projection region where the projection light (image light) PL from the projector 100 is projected. Although not shown, the projector system 500 further includes, for example, a PC or any other apparatus connected to the projector 100, and the PC carries out a variety of processes as required to allow an image action in an interactive situation in which writing onto a display screen in the irradiated region PLa is accepted. In the projector system 500, the projector 100 is a projector of a short focal length type (what is called ultrashort focal length proximity projection in the description) that is installed in a position obliquely above the screen SC and performs proximity projection toward the screen SC, which is located in a position obliquely below the projector 100, as described above. The projector 100 is formed of a projector main body 100$p$, which is a main body for the image projection, and an imaging system 50. In particular, the imaging system 50 in the present embodiment is formed of four imagers (cameras 50$a$, 50$b$, 50$c$, and 50$d$) disposed at the four corners of an enclosure CA of the projector 100. The four cameras 50$a$, 50$b$, 50$c$, and 50$d$ allow accurate sensing of the position of a pointing element OB. In the present embodiment, the description will be made on the assumption that the vertically downward direction is called a direction Y (direction +Y), that the surface of the screen SC is parallel to an XY plane, and that the projector 100 is so installed with respect to the screen SC that the direction extending from the front side of the projector 100 coincides with a direction +Z.

The projector main body 100$p$ projects the projection light PL, which is image light that is the combination of light fluxes that belong to the visible wavelength band, toward the screen SC to form a projection image (color image). In the projector system 500, to allow the interactive image projection, alignment (calibration) for identifying the position of the pointing element on a projection screen needs to be performed as a prerequisite.

Figure 2:
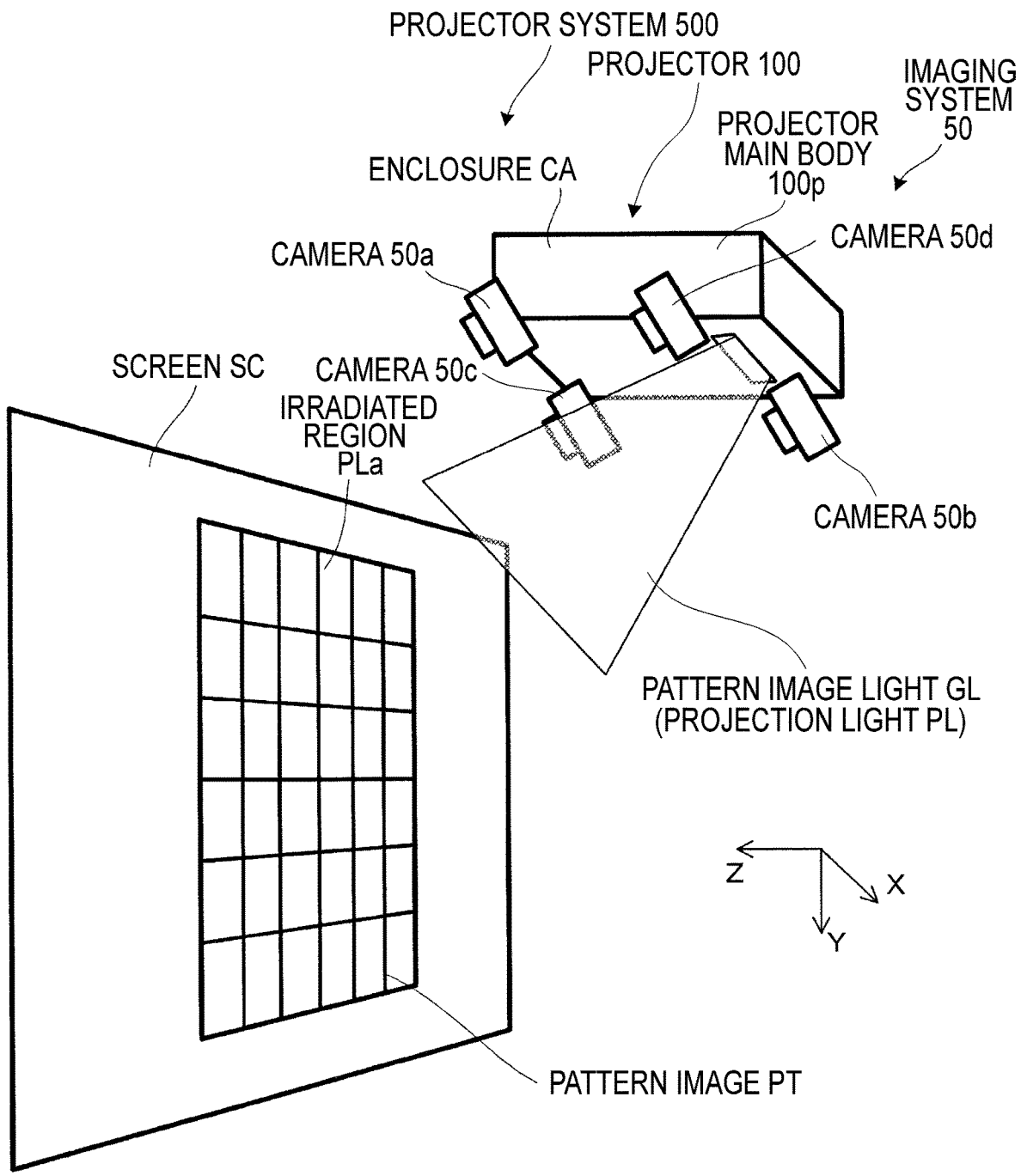
FIG. 2 shows that a pattern image is projected at the time of calibration.

The calibration, which is the alignment process that is a prerequisite for allowing the interactive image projection, will be described below with reference to FIG. 2. FIG. 2 shows the image projection performed by the projector main body 100p, in particular, FIG. 2 shows that a pattern image is projected at the time of the calibration to perform the calibration process described above. In the present embodiment, a pattern image PT, which shows the range of video images projected on the screen SC by the image projection (projection) performed by the projector main body 100p, is first projected by using pattern image light GL, which is formed of light that belongs, for example, to the green wavelength band out of the light components that are contained in the projection light PL, which is the image light, and belong to the visible light wavelength band. The imaging system 50 receives the light components of part of the pattern image light GL to acquire image information on the pattern image PT and identifies the image projection position based on the information. Specifically, the imaging system 50 first transmits the image information on the captured pattern image PT to the projector main body 100p. The projector main body 100p then relates the information on the pattern image PT acquired by the imaging system 50 to information on a pixel matrix in light modulator. That is, each position of the pattern image PT captured by the imaging system 50 on a light receiving sensor is related to a corresponding position on the image matrix in the light modulator performed by the projector main body 100p, that is, a position on the projected image. The relating process may be carried out on a pixel basis (for example, corresponding table may be created), or the relating process may be carried out by specifying a relating function. As described above, the projector main body 100p relates the image projection position based on the information on the pattern image PT acquired by the imaging system 50 to the positions of the pixels in the light modulator to perform the calibration (alignment). After the calibration, the position located on the pattern image PT and pointed with the pointing element OB, the position of which is detected by the imaging system 50, can be identified based on the relating process in the calibration, whereby the interactive image projection that reflects the information on the identified position of the pointing element OB can be performed.

As another prerequisite for the interactive image projection described above, the position of the pointing element OB needs to be detected with accuracy. In the present embodiment, the four cameras 50a, 50b, 50c, and 50d, which form the imaging system 50, acquire necessary parallax information without increase in the resolution of the cameras or lens performance and with increase in the inter-camera distance suppressed to allow accurate detection of the position of the pointing element OB.

Figure 3:
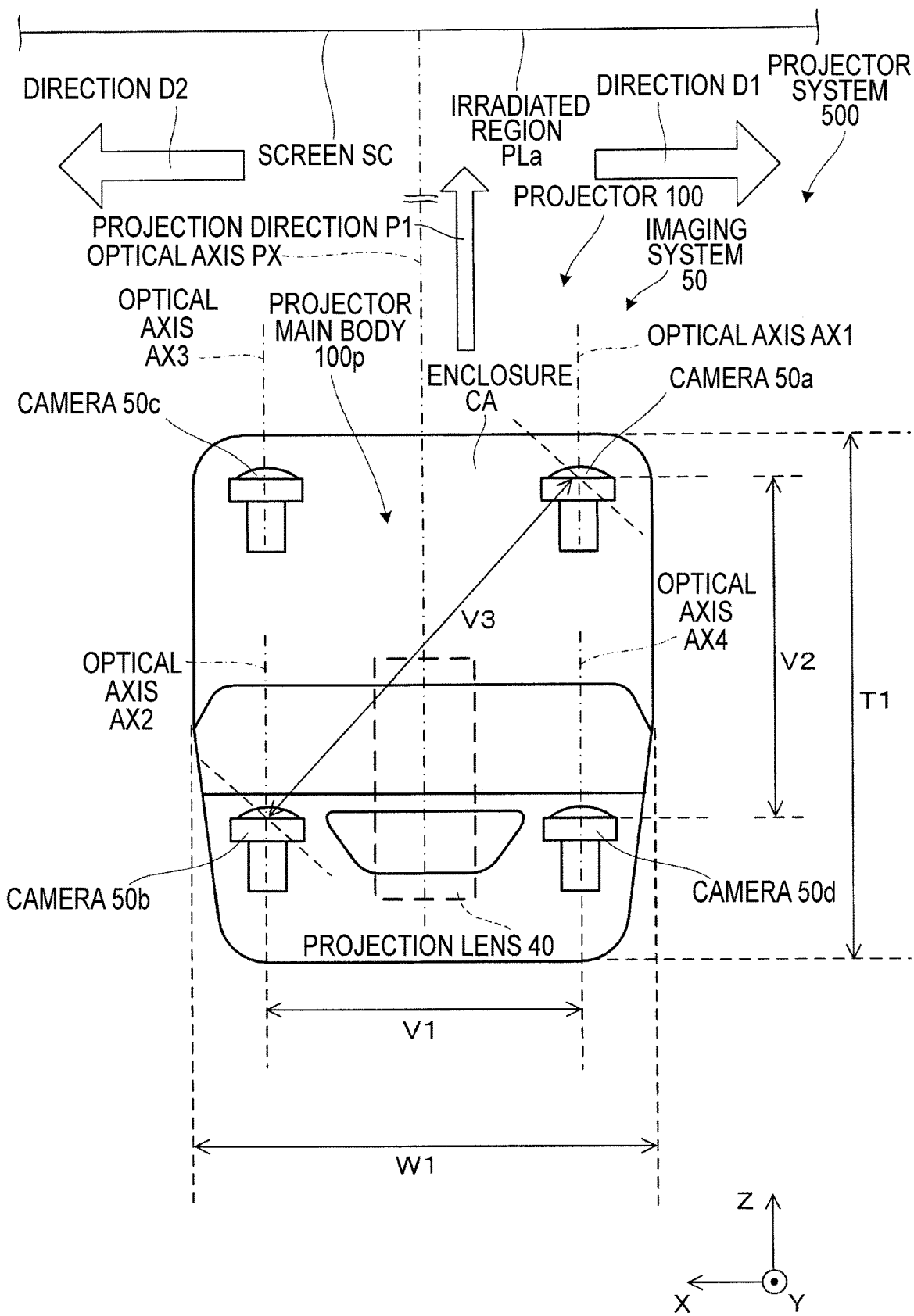
FIG. 3 is a plan view showing the configuration of the projector system.

The configurations of the projector main body 100p, the imaging system 50, and other components will be described below with reference to FIGS. 1 and 3 and other figures. In FIGS. 1 and 3 and other figures, the cameras 50a, 50b, 50c, and 50d, which form the imaging system 50, are so drawn as to protrude downward from the enclosure CA for ease of the description, but the cameras 50a, 50b, 50c, and 50d can be so disposed not to protrude or to hardly protrude downward from the enclosure CA or can be built in the enclosure CA.

The projector main body 100p, although the entire configuration thereof will not be illustrated in detail, includes a light source, a light modulator, a projection system, and other components and projects an image on the screen SC. In the description, the projection light PL, which serves as the image light, exits out of a projection lens 40, which is the projection system accommodated in the enclosure CA, as shown, for example, in FIG. 3. The projection optical axis of the projection lens 40, which is disposed at the center of the enclosure CA, is called an optical axis PX. The projector main body 100p further includes an image projecting section and a projector controller as well as the components described above and performs a variety of action control, such as image projection. For example, the projector controller can accept information from the imaging system 50 and perform on-screen writing by correcting the content of an image to be projected in consideration of the information from the imaging system 50 based on the calibration, which relates the positions of pixels in an image forming section (pixel matrix in light modulator) that forms the projector main body 100p to the positions of pixels in an imaging device (light receiving sensor) built in each of the cameras that form the imaging system 50. That is, the interactive image projection can be performed.

The optical system that forms the projector main body 100p can be implemented in a variety of aspects. For example, the light source and other components can be configured in a variety of manners, and laser light source, an LED light source, and even an organic EL (O-LED) light source can, for example, be used. In particular, in a case where an organic EL device or any other self-luminous light source is used, the projector main body 100p can be configured as a video apparatus in which the light source also performs light modulator. In a case where the light source (backlight) and the light modulator are components separate from each other, the light modulator can, for example, be a transmissive liquid crystal panel.

The imaging system 50 is a sensor apparatus that captures a projection image projected by the projector main body 100p to acquire image information. In the present embodiment, in particular, the imaging system 50 is formed of the four imagers so disposed as to be separate from one another. Specifically, the imaging system 50 is formed of the first camera 50a, which is a first imager, the second camera 50b, which is a second imager, the third camera 50c, which is a third imager, and the fourth camera 50d, which is a fourth imager. The cameras 50a, 50b, 50c, and 50d comply with the same standard. The first camera 50a and the second camera 50b are paired with each other, and the third camera 50c and the fourth camera 50d are paired with each other, with the two pairs disposed in a bilaterally symmetric form with respect to the position where the projection light PL is projected by the projector main body 100p. The cameras 50a, 50b, 50c, and 50d each include, for example, an imaging lens system, a light receiving device (imaging device), that is, a light receiving sensor, and a controller that performs a variety of types of control including transmission to another apparatus via a communicator. The projector 100, which includes the plurality of cameras 50a, 50b, 50c, and 50d (stereocamera) described above, can acquire parallax information based on parallax images (or stereo image). That is, more sophisticated position detection based on stereovision can be performed. In the present embodiment, in particular, the first camera 50a and the second camera 50b, which are located in diagonal positions out of the four corners of the enclosure CA, capture a set of parallax images, and the third camera 50c and the fourth camera 50d, which are located in the other diagonal positions, capture another set of parallax images to allow acquisition of parallax information based on the two sets of parallax images that differ from each other in terms of imaging range. That is, extracting parallax information from each of the two sets of captured parallax images allows sensing of the position of the pointing element.

In the present embodiment, in which the plurality of cameras 50a, 50b, 50c, and 50d allow parallax-based three-dimensional detection of the pointing element (fingertip) OB, which is a detection target, a finger of a user who touches the screen SC, for example, needs to be grasped as a three-dimensional shape having a depth. To this end, the imaging is so performed in a strict sense that the imaging region contains not only the irradiated region PLa, which is the projection region on the screen SC, but a three-dimensional region including the irradiated region PLa. Therefore, in the present embodiment, to capture an image of a region, for example, from the fingertip to the wrist, the imaging region contains in practice a box-shaped three-dimensional region CD having a thickness of about 16 cm measured from the irradiated region PLa. It is, however noted in the following description that the irradiated region PLa is so defined as to include the three-dimensional region CD having a thickness and the thus defined irradiated region PLa is the imaging range.

The arrangement and other factors of the cameras 50a, 50b, 50c, and 50d, which form the first to fourth imagers of the imaging system 50, in particular, out of the components of the projector 100 will be described below with reference to FIG. 3. FIG. 3 is, apparent from the X, Y, and Z directions set therein, a bottom view of the projector 100 hung from a ceiling (from above) as shown in FIG. 1. In the following description, the pair of the first camera 50a and the second camera 50b in the imaging system 50 will be described, and the other pair of the third camera 50c and the fourth camera 50d will be not described in detail because the two pairs are symmetrically configured.

The first camera 50a and the second camera 50b are disposed in diagonal positions out of the four corners of the enclosure CA, as shown in FIG. 3. More specifically, the first camera 50a is disposed in a position separate from the optical axis PX, which is the projection optical axis of the projector main body 100p including the projection lens 40 and other components, in a first direction D1 (direction −X), which is one of the directions perpendicular to a projection direction P1 of the projector main body 100p, and the second camera 50b is disposed in a position separate from the optical axis PX of the projector main body 100p, which includes the projection lens 40 and other components, in a second direction D2 (direction +X), which is the direction opposite the first direction D1 (direction −X). That is, the first camera 50a is disposed in a position separate from the optical axis PX in the first direction D1 perpendicular to the projection direction P1, and the second camera 50b is disposed in a position separate from the optical axis PX in the second direction D2 perpendicular to the projection direction P1 and opposite the first direction D1. Further, the first camera 50a and the second camera 50b differ from each other in terms of the distance to the region where the image light from the projector main body 100p is projected, that is, the distance to the irradiated region PLa or the screen SC. In other words, the first camera 50a and the second camera 50b are disposed in positions shifted from each other in the projection direction P1. In the example shown in FIG. 3, the first camera 50a is disposed in a position closer to the screen SC than the second camera 50b. Similarly, the third camera 50c and the fourth camera 50d are so disposed that the third camera 50c is separate from the optical axis PX of the projector main body 100p in the second direction D2 and the fourth camera 50d is separate from the optical axis PX of the projector main body 100p in the first direction D1 with the third camera 50c disposed in a position closer to the screen SC than the fourth camera 50d. That is, the first camera 50a and the third camera 50d are disposed in positions closer to the projection region than the second camera 50b and the fourth camera 50d. Further, the positional relationship between the first camera 50a and the third camera 50c is so set that the first camera 50a and the third camera 50c are separate from each other in the first direction D1 and the second direction D2, which is opposite thereto, respectively, and disposed in positions equidistant to the region where the image light from the projector main body 100p is projected. In correspondence to the arrangement described above, the positional relationship between the second camera 50b and the fourth camera 50d is so set that the second camera 50b and the fourth camera 50d are separate from each other in the second direction D2 and the first direction D1, respectively, and disposed in positions equidistant to the region where the image light from the projector main body 100p is projected.

Based on the arrangement described above, in the present embodiment, each dimension shown in FIG. 3 is set, for example, as follows: First, the enclosure CA, which defines the size of the projector 100, has a lateral width W1 of 367 mm in the lateral direction (direction X), a depth width T1 of 400 mm in the depth direction (direction Z), an inter-camera distance V1 of 240 mm in the lateral direction (direction X), and an inter-camera distance V2 of 250 mm in the depth direction (direction Z). Further, the relationship between the distances V1 and V2 derives a distance V3 of 347 mm between the cameras in the diagonal positions.

Optical axes AX1 to AX4 of the cameras 50a, 50b, 50c, and 50d are parallel to the optical axis PX of the projector main body 100p when projected on a plane parallel to the XZ plane, as shown in FIG. 3. It is, however, noted not only that since the projector main body 100p projects the image light obliquely downward, as described above, tilt projection is, for example, performed, but that since the irradiated region PLa, which is the imaging target, is obliquely below the cameras 50a, 50b, 50c, and 50d, the cameras 50a, 50b, 50c, and 50d also each incline by a tilt angle that falls within a predetermined angular range.

The tilt angle of each of the cameras 50a, 50b, 50c, and 50d will be described below with reference to FIG. 4.

Figure 4:
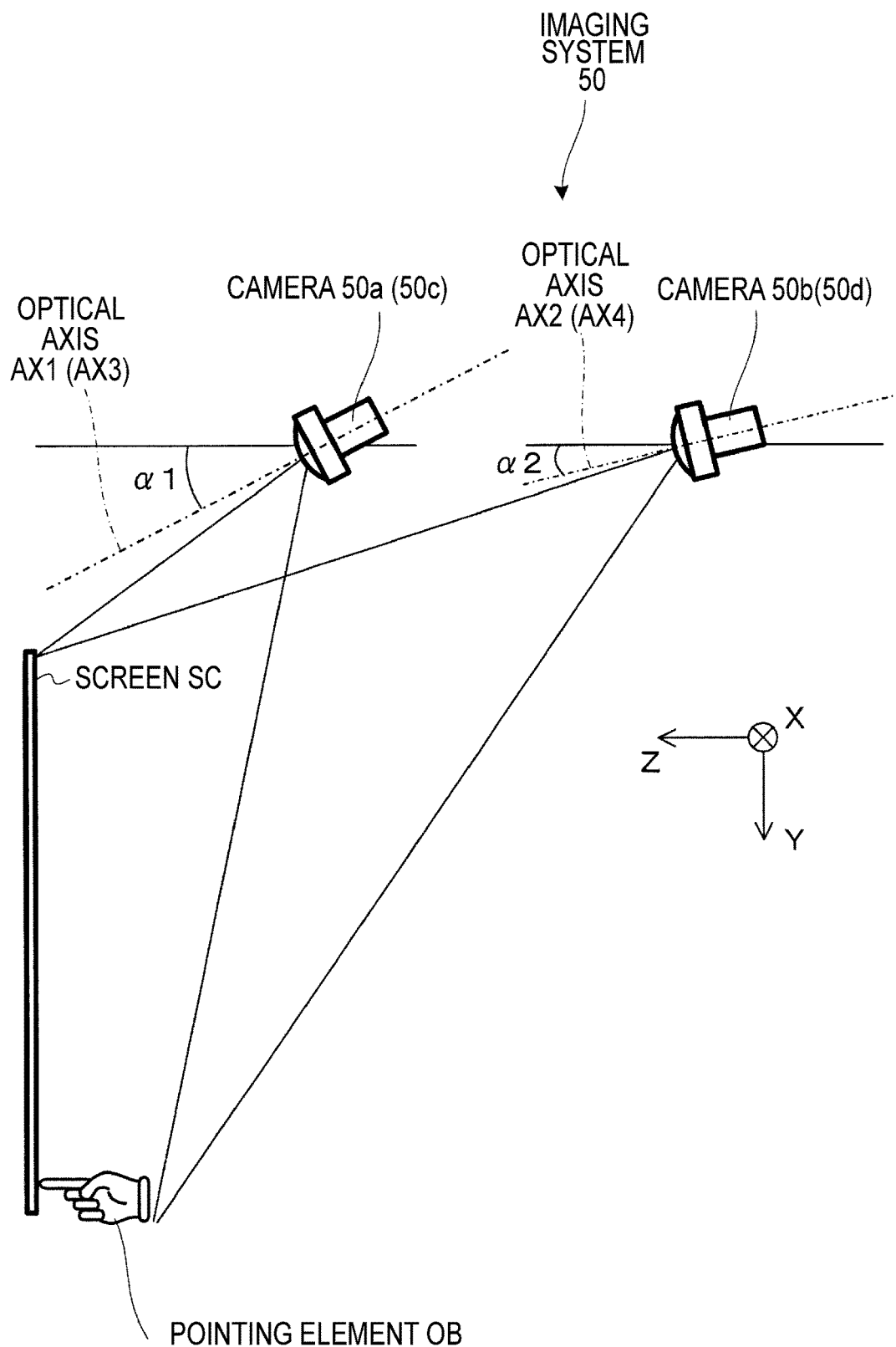
FIG. 4 describes the tilt angle of an imager.

FIG. 4 describes the attitude and imaging range of the imaging system 50 in the projector system according to the present embodiment. FIG. 4 shows the cameras 50a and 50b out of the four cameras that form the imaging system 50, and the same holds true for the cameras 50c and 50d. As apparent from FIG. 4, in this case, the optical axis AX1 of the first camera 50a is not perpendicular to the screen SC but inclines downward by a tilt angle $\alpha 1$. Similarly, the optical axis AX2 of the second camera 50b is not perpendicular to the screen SC but inclines downward by a tilt angle $\alpha 2$. Further, comparison between the tilt angle $\alpha 1$ and the tilt angle $\alpha 2$ shows that the tilt angle $\alpha 1$ is greater than the tilt angle $\alpha 2$. That is, the first camera 50a, which is closer to the screen SC, has a greater tilt angle than the second camera 50b, which is farther from the screen SC. Similarly, the third camera 50c has a greater tilt angle than the fourth camera 50d. The tilt angles $\alpha 1$ and $\alpha 2$ are conceivably set, for example, at specific values of $\alpha 1=27°$ and $\alpha 2=15°$.

Further, in the present embodiment, the pair of imagers formed of the first camera 50a and the second camera 50b, for example, do not capture the entire irradiated region PLa, which is the projection region on the screen SC, but capture part of the irradiated region PLa.

Figure 5:
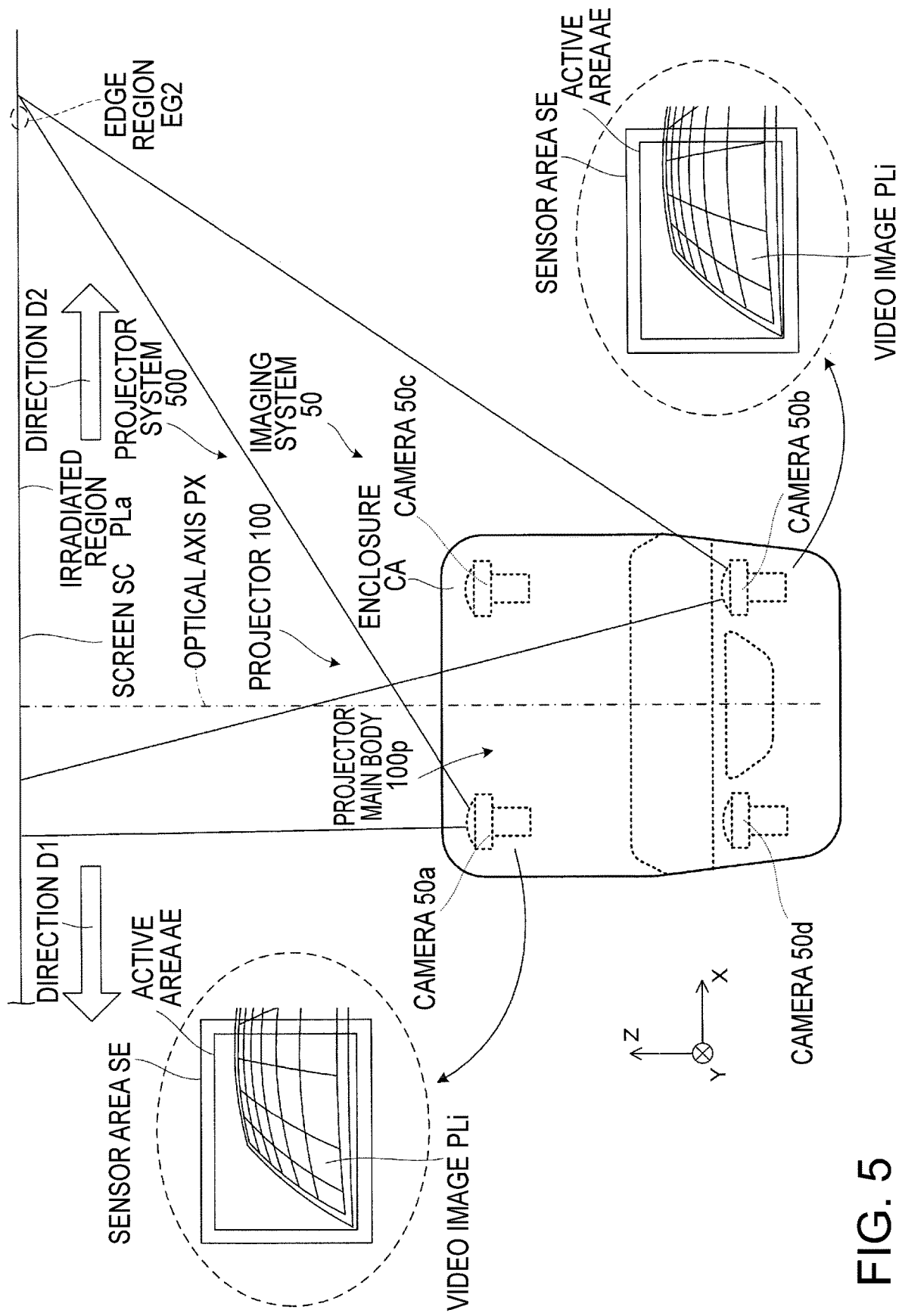
FIG. 5 describes parallax image (stereo image) acquisition performed by a pair of imagers and the imaging ranges thereof.

The parallax image acquisition performed by a pair of imagers and the imaging ranges thereof will be described below with reference to FIG. 5. FIG. 5 shows the projector 100 hung from a ceiling (from above) and viewed further from above. That is, FIG. 5 shows the projector 100 viewed from the side opposite the side from which the projector 100 is viewed in FIG. 3. In this case, the camera 50a and other cameras, for example, are drawn with broken lines because they are located in the enclosure CA or below the enclosure CA. The following description will be made of the imaging ranges of the first camera 50a and the second camera 50b, which are one of the two pairs of imagers that form the imaging system 50. The first camera 50a and the second camera 50b can each capture, from the positions where the first camera 50a and the second camera 50b are located, an image of at least right-half of the irradiated region PLa, that is, at least +X-side-half of the irradiated region PLa to acquire a parallax image and in turn parallax information over this range, as shown in FIG. 5. In other words, the first camera 50a and the second camera 50b can each capture at least half the irradiated region PLa containing an edge region EG2 on the side in the second direction D2, which is one of the first direction D1 and the second direction D2, which is opposite the first direction D1. Similarly, the third camera 50c and the fourth camera 50d, which form the other pair of imagers, can each capture, from the positions where the third camera 50c and the fourth camera 50d are located, at least left-half of the irradiated region PLa, that is, at least −X-side-half of the irradiated region PLa (region containing remaining region that is not captured with the first camera 50a or the second camera 50b) to acquire the remaining necessary parallax information. In other words, the third camera 50c and the fourth camera 50d can each capture at least half the irradiated region PLa containing an edge region EG1 (see FIG. 1 and other figures) on the side in the first direction D1, which is the other one of the first direction D1 and the second direction D2, which is opposite the first direction D1 to acquire the remaining necessary parallax information. That is, in the imaging system 50, the four cameras 50a, 50b, 50c, and 50d cooperate with one another to allow acquisition of parallax images of the entire irradiated region PLa. The light receiving device (imaging device) of each of the four cameras 50a, 50b, 50c, and 50d, specifically, an active area AE, which is an effective imaging range of an area SE of the sensor, captures video images PLi corresponding to part of the irradiated region PLa. Therefore, to allow imaging of the entire irradiated region PLa on the screen SC, a common video image PLi captured with the active areas AE of the pair of cameras 50a and 50b connected to a common video image PLi acquired with the active areas AE of the pair of cameras 50c and 50d need to form an image corresponding to the entire irradiated region PLa.

In this case, the pair of first camera 50a and the second camera 50b, which are so disposed that the first camera 50a relatively close to the irradiated region PLa is located on the −X side and the second camera 50a relatively far away from the irradiated region PLa is located on the +X side, each capture an image of the +X-side region of the irradiated region PLa, whereby the parallax between the first camera 50a and the second camera 50b is more readily obtained. The same holds true for the arrangement of the third camera 50c and the fourth camera 50d, which form the other pair, because the two pairs are symmetrically configured.

A central range where the imaging ranges of the first camera 50a and the second camera 50b overlap with the imaging ranges of the third camera 50c and the fourth camera 50d may be so processed as appropriate, for example, by the projector controller of the projector main body 100p that no imaging collision occurs, for example, by determination of the priority on a location basis.

In the case described above, none of the cameras 50a, 50b, 50c, and 50d needs to capture an image of the entire irradiated region PLa. From a different point of view, the cameras can each capture a large image of a subject. Further, in the case described above, an end of the screen can be shifted toward the center of an image captured with each of the cameras, as compared with the case where the cameras each capture an image of the entire irradiated region PLa. It is therefore believed that the position of the pointing element can be sensed with a small amount of error.

As described above, the four cameras 50a, 50b, 50c, and 50d are disposed at the four corners of the enclosure having a rectangular shape in a plan view, the cameras in the diagonal positions are paired with each other, and parallax information is acquired based on parallax images acquired over the imaging range which is about half the entire irradiated region and where parallax is readily obtained. The configuration described above allows accurate sensing of the position of the pointing element OB with the imaging system 50 configured not to greatly protrude from the enclosure CA.

The projector system 500 according to the present embodiment performs what is called an ultrashort focal length proximity projection, as described above. The imaging system 50 (cameras 50a, 50b, 50c, and 50d), which is attached in the vicinity of the projector main body 100p, desirably has a wide imaging range to some extent. Further, the imaging system 50 needs to operate in a stereocamera scheme and have a wide angle of view also from the viewpoint of acquisition of the three-dimensional position of a finger that is the pointing element. In this case, it is likely to be difficult to use a typical lens, and it is conceivable to use a fisheye lens.

As the fisheye lens, it is conceivable, for example, to employ an equidistant projection method, for example, using a lens called an fθ lens. Further, the imaging may instead be performed by using a lens having the characteristic expressed by the following equation (stereographic projection method):

$$y = 2f \cdot \tan\left(\frac{\theta}{2}\right)$$

In the equation, f represents the focal length, θ represents the half angle of view (or simply represents angle of view), and y represents the image height. In this case, distortion (compression) in a captured image can be suppressed particularly at the periphery, as compared with the equidistant projection method.

Figure 6:
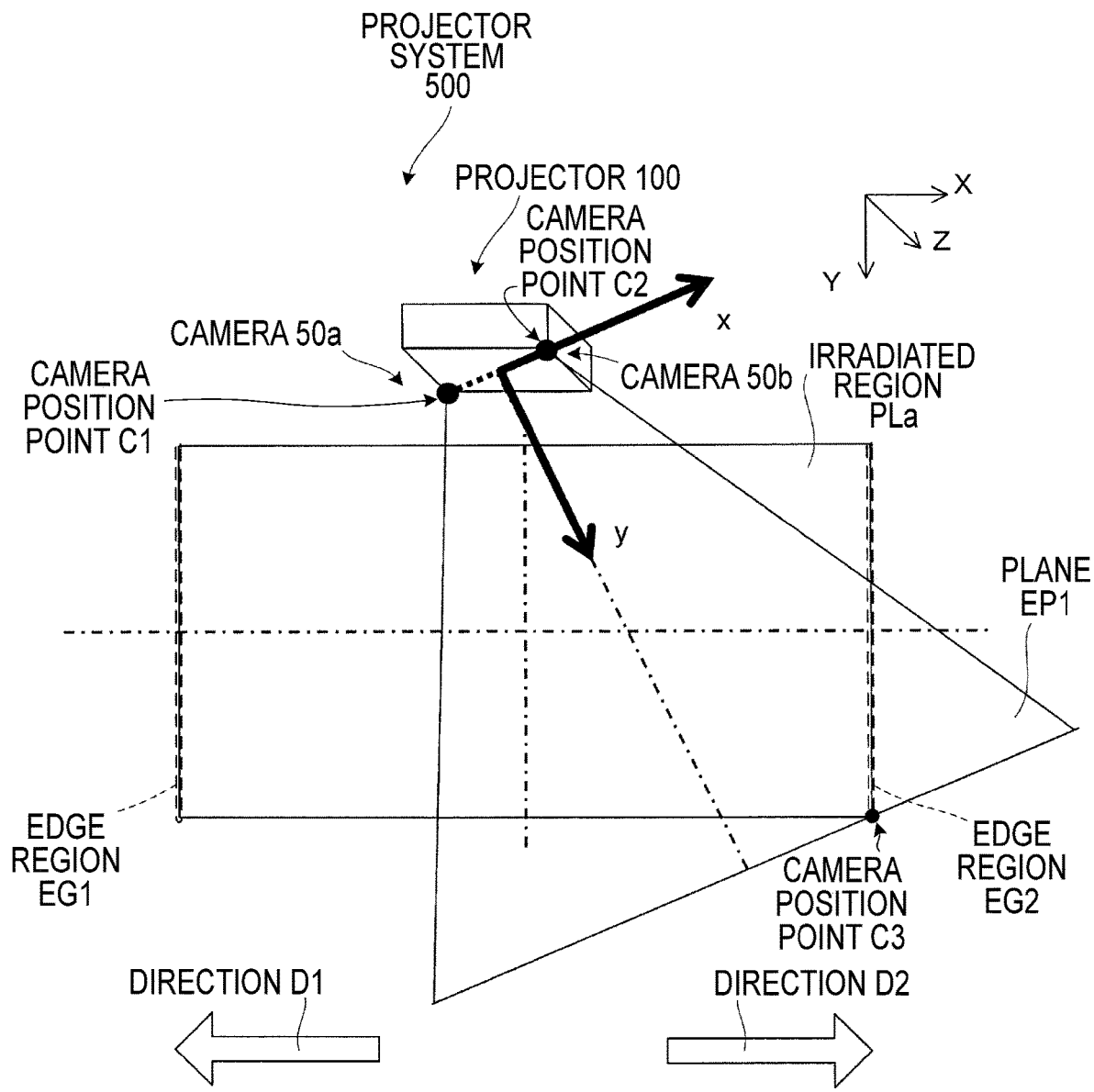
FIG. 6 shows an example of an imaging position and a projection position for evaluating accuracy of parallax information.
Figure 7:
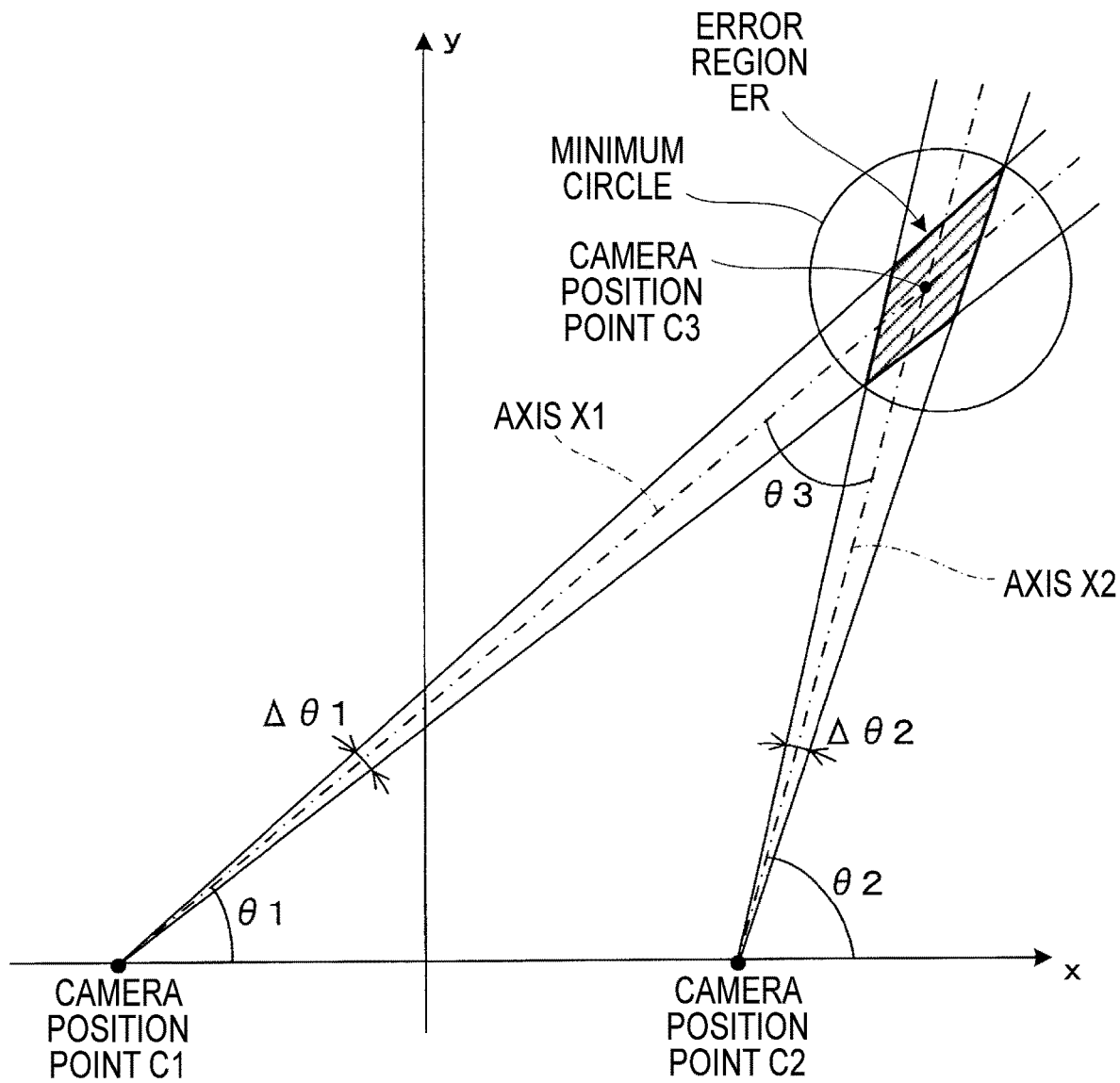
FIG. 7 describes an index of the accuracy of the parallax information.
Figure 8:
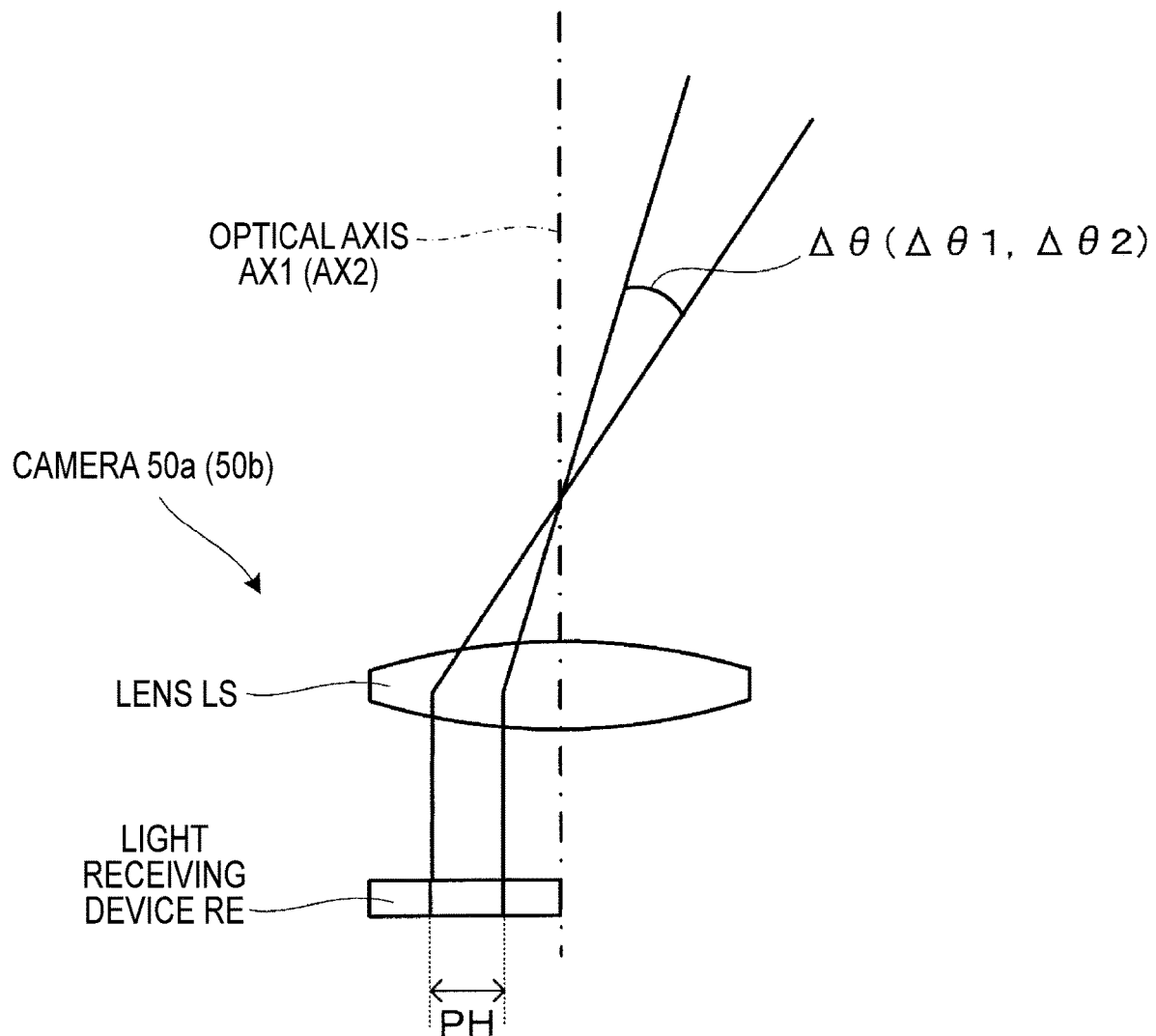
FIG. 8 describes the relationship between the accuracy of the parallax information and imaging performance.

A method for evaluating the accuracy of the position sensing performed by the imaging system 50 will be considered below with reference to FIG. 6 and other figures. FIGS. 6 to 8 describe a method for calculating an error region of a stereocamera as an example of an index of the accuracy of the parallax information.

First, FIG. 6 shows consideration of the imaging ranges of the first camera 50a and the second camera 50b described above, and the points C1 and C2 in FIG. 6, for example, represent the positions where the first and second camera 50a, 50b are disposed in the projector 100. When the pair of first camera 50a and second camera 50b capture images of the +X-side-half of the irradiated region PLa, a point C3, which is the lower right corner position of the irradiated region PLa, is the position where the detection accuracy is lowest because the point C3 is farthest from the two cameras 50a and 50b and the amount of parallax is therefore smallest. That is, it is necessary to reliably detect the pointing element at the point C3. Consider now an error produced by the cameras 50a and 50b when they perform position sensing at the point C3 and therearound by using a plane EP1, which passes through the three points C1, C2, and C3, as a reference plane. It is assumed in the consideration that in the plane EP1, the direction of the straight line passing through the points C1 and C2 is a direction x, and that in the plane EP1, the direction perpendicular to the direction x and having a positive side facing the point C3 is a direction y, and an axis x and an axis y extending in the x and y directions are specified with respect to the middle point between the points C1 and C2, as shown in FIG. 6.

In the case described above, it is assumed that an axis X1, which extends from the point C1 at an angle of elevation θ1 with respect to the x axis, and an axis X2, which extends from the point C2 at an angle of elevation θ2 with respect to the x axis, intersect each other at the point C3. In this case, the angle θ3 between the axis X1 and the axis X2 corresponds to the difference in angle (parallax) between the first camera 50a and the second camera 50b at the point C3. The angle θ3 is a value determined by the positional relationship among the three points C1, C2, and C3, that is, the arrangement of the first and second cameras 50a, 50b and the irradiated region PLa, as described above, and the greater the angle θ3 is, the more readily the parallax is obtained.

On the other hand, FIG. 7 further shows minute angles Δθ1 and Δθ2, which spread from the points C1 and C2 and on the opposite sides of the axes X1 and X2. The minute angles Δθ1 and Δθ2 represent the performance of the cameras 50a and 50b.

FIG. 8 describes the nature of a minute angle Δθ corresponding to the minute angles Δθ1 and Δθ2. In relation to a light receiving device RE and a lens LS, which form the camera 50a (or camera 50b), the minute angle Δθ corresponds to the range of light incident on one pixel interval PH of the light receiving device RE through the lens LS, as shown in FIG. 8. That is, the minute angle Δθ is a limit angle meaning that light incident on the range is considered as the same point on the light receiving device RE. That is, the minute angles Δθ1 and Δθ2 in FIG. 7 represent resolution limits associated with the performance of the cameras 50a and 50b. In other words, the angles smaller than the minute angle are all handled as one pixel by each of the cameras 50a and 50b, are therefore not distinguished from one another, and are each handled as an error. Based on the above discussion, the quadrangular region determined by the minute angles Δθ1 and Δθ2, which spread on opposite sides of the axes X1 and X2, and the angle θ3 is called an error region ER. The shape of the error region ER is determined by the minute angles Δθ1 and Δθ2 and the angle θ3, and the smaller the minute angles Δθ1 and Δθ2 or the greater the angle θ3, the more accurate position detection. When this is considered in terms of the shape of the error region ER, the greater the minute angles Δθ1 and Δθ2, the larger the shape, and the smaller the angle θ3, the more elongated the shape.

That is, the error region ER can be considered as follows: The more elongated and larger the error region ER is, the worse the accuracy of the position detection is; whereas the smaller the size is and the more balanced the aspect ratio is, the better the accuracy of the position detection is. It is therefore conceivable to use the size of a minimum circle MC (radius of circle MC), which encompasses the error region ER, as an index of the accuracy of the position detection. Although image processing allows identification in a unit smaller than one pixel described above, the fact that the method described above is one index of the accuracy of the position sensing remains true.

FIG. 9 and other figures show studies on the index for a specific configuration example of the projector 100 according to the present embodiment, and the upper portion of FIG. 9, for example, shows the reference plane that passes through the three points, C1, C2, and C3 in the specific configuration example. Specifically, in the projector 100 described above, the enclosure CA has the lateral width W1 of 367 mm and the depth width T1 of 400 mm, and the projection lens 40 is disposed at the center of the enclosure CA and performs obliquely downward projection. In the following description, it is assumed that the projection distance of the projector 100 (distance in direction Z) is 722 mm, and that the size of the irradiated region PLa is 120 inches (aspect ratio of 16:10). The throw ratio, which is calculated by the projection distance and the lateral size of the irradiated region PLa, is set at about 0.28. On the other hand, the cameras 50a, 50b, 50c, and 50d disposed at the four corners of the enclosure CA are so arranged that the inter-camera distance V1 in the lateral direction (direction X) is 240 mm and the inter-camera distance V2 in the depth direction (direction Z) is 250 mm, and the relationship between the distances V1 and V2 derives the distance V3 of 347 mm between the cameras in the diagonal positions, as described above. Further, the tilt angle α1 of the first and third cameras 50a, 50c is set at 27°, and the tilt angle α2 of the second and fourth cameras 50b, 50d is set at 15°. The angle θ3 is determined by the difference between the angles of elevation θ2 and θ1, and the angle θ3 is about 8.1° from the values of the angles of elevation θ1 and θ2 determined in the case described above.

Figure 10A:
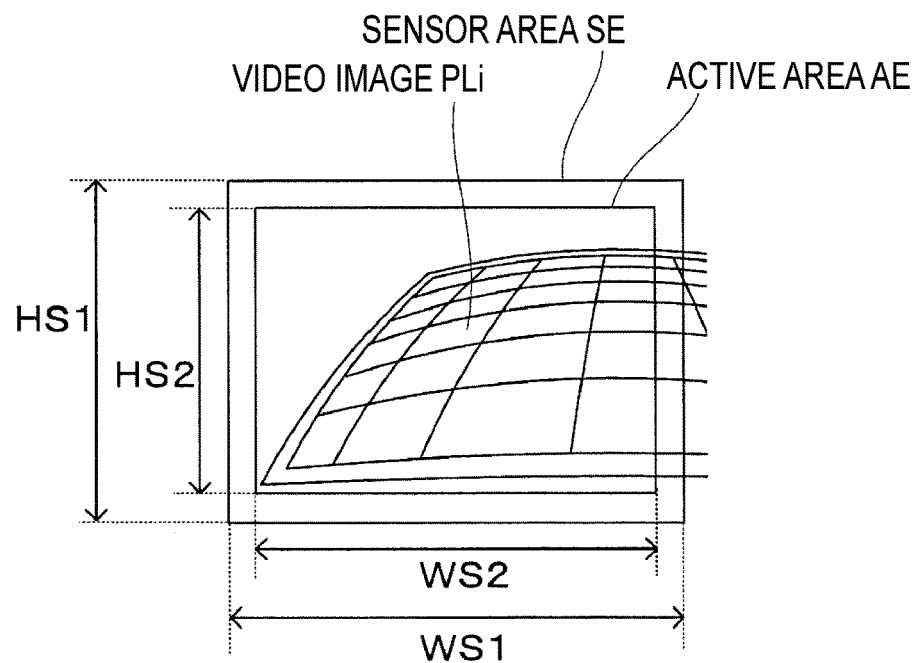
FIG. 10A shows a specific example of an imaging device that forms the imager.

The cameras 50a, 50b, 50c, and 50d comply with the same standard, and it is assumed in the description that the imaging lens system employs the stereographic projection method by way of example, and the focal length f thereof is 2.82 mm. As for the light receiving device (imaging device), it is assumed that the lateral size of the area SE is WS1 and the longitudinal size thereof is HS1, and that the lateral size of the active area AE is WS2 and the longitudinal size thereof is HS2, as shown in FIG. 10A. It is assumed in the description that the lateral size WS1 is 5.12 mm, the longitudinal size HS1 is 3.84 mm, the lateral size WS2 is 4.48 mm, and the longitudinal size HS2 is 3.20 mm. Further, the number of pixels of the light receiving device (imaging device) is set at 2048×1536. In this case, the pixel interval PH shown in FIG. 8 is 2.5 μm.

In each of the thus configured cameras 50a, 50b, 50c, and 50d, first, the imaging lens system, which employs the stereographic projection method, satisfies the following Expression (1), as described above:

$$y = 2f \cdot \tan\left(\frac{\theta}{2}\right) \tag{1}$$

In Expression (1), f represents the focal length, θ represents the half angle of view (or simply represents angle of view), and y represents the image height. Expression (1) can be deformed into $$\theta = 2 \cdot \tan^{-1}\left(\frac{y}{2f}\right) \quad (2)$$

The minute angle Δθ shown in FIG. 8 is formulated by referring to Expression (2) as follows:

$$\Delta\theta = \theta(y + PH) - \theta(y) \quad (3)$$
$$= 2 \cdot \tan^{-1}\left(\frac{y + PH}{2f}\right)$$
$$- 2 \cdot \tan^{-1}\left(\frac{y}{2f}\right)$$

Figure 10B:
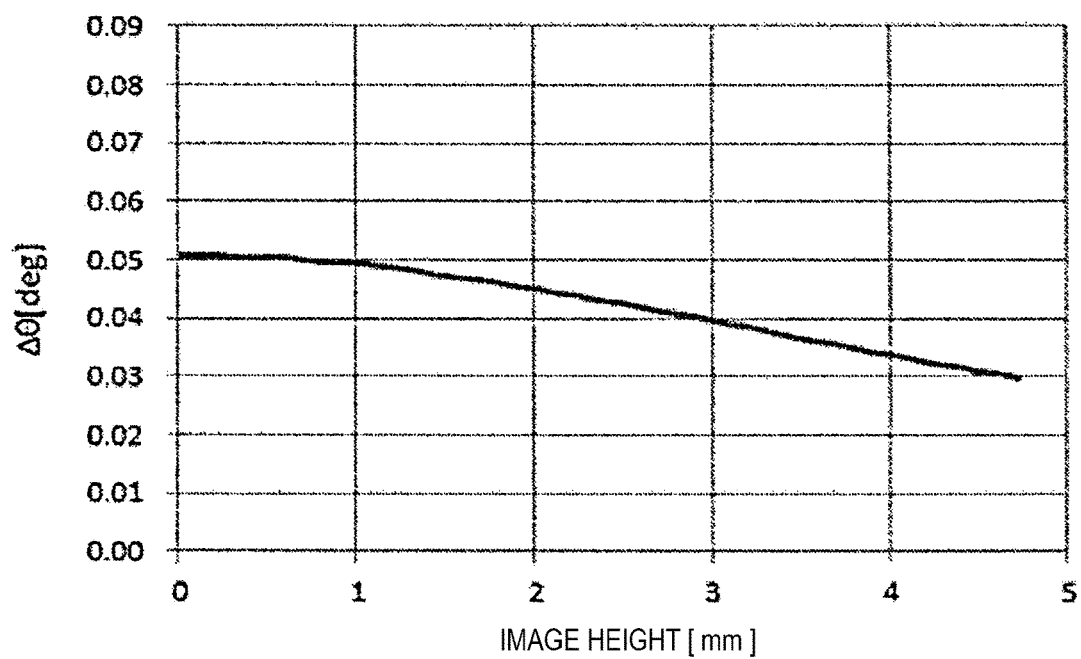
FIG. 10B is a graph showing the relationship between the image height of an image produced by the imager and a minute angle in the specific example.

In Expression (3), PH represents the pixel interval. FIG. 10B is a graph representing Expression (3) with the horizontal axis representing the image height y and the vertical axis representing the minute angle Δθ. In the case of the design using the numerical values described above, the angle of view of the camera 50a disposed at the point C1 in a case where the camera 50a captures an image of the point C3, which corresponds to the right corner of the screen SC, is about 57.9°. In this case, since the image height y is about 3.1 mm from Expression (1), and the pixel interval PH is 2.5 μm, Expression (3) or the graph corresponding thereto in FIG. 10B provides a minute angle Δθ1 of about 0.039°. Further, the angle of view of the camera 50b disposed at the point C2 in a case where the camera 50b captures an image of the point C3 is about 59.7°. In this case, the same calculation provides an image height y of about 3.2 mm and a minute angle Δθ2 of about 0.0038°.

In the case described above, that is, in the case where the angle θ3 is 8.1°, the minute angle Δθ1 is 0.039°, and the minute angle Δθ2 is 0.038°, the error region ER and the minimum circle MC, which encompasses the error region ER, shown in the lower portion of FIG. 9 are obtained.

It has been known that an attempt to configure an imaging system that provides an error region ER and a minimum circle MC having roughly the same sizes described above by arranging two cameras having the same performance as that of the camera 50a and other cameras described above in the direction X requires the inter-camera distance (lateral width direction interval) to be about 600 mm. In this case, the imagers (cameras) undesirably greatly protrude from the enclosure CA having the size described above. It is, however, obvious that setting the distance between two cameras at a value smaller than 600 mm, for example, at about 240 mm, which is the same distance described above, does not allow acquisition of sufficient parallax information.

As described above, the projector system 500 according to the present embodiment, in which the cameras 50a, 50b, 50c, and 50d, which are the four imagers that form the imaging system 50, can capture two sets of parallax images that differ from each other in terms of imaging range, allows acquisition of parallax information that allows high-accuracy position sensing with the inter-camera distance reduced. As a result, for example, in achieving the interactive image projection by using the parallax information to detect the pointing element OB on the irradiated region PLa, which is the projection screen, the size of the imaging system can be reduced.

Second Embodiment

A second embodiment, which is a variation of the first embodiment, will be described below with reference to FIG. 11 and other figures. A projector system 600 according to the present embodiment has the same configuration as that in the first embodiment except that the attitude of an imaging system 250 is changed, and the entire projector system will not therefore be described. Further, it is assumed that a specific configuration example (specific specifications) is the same as that shown in the first embodiment.

Figure 11:
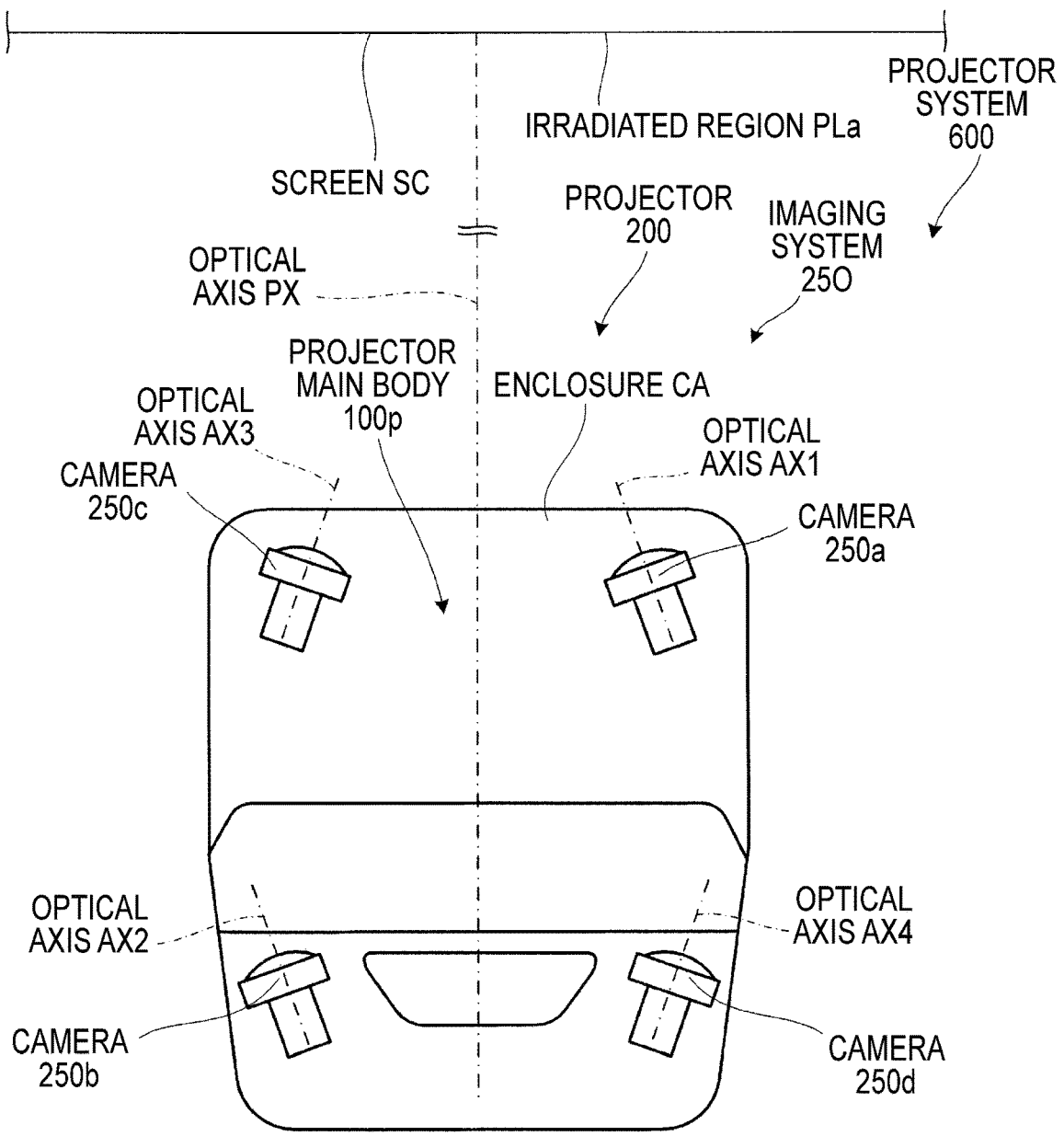
FIG. 11 is a plan view showing the configuration of a projector system according to a second embodiment.
Figure 12:
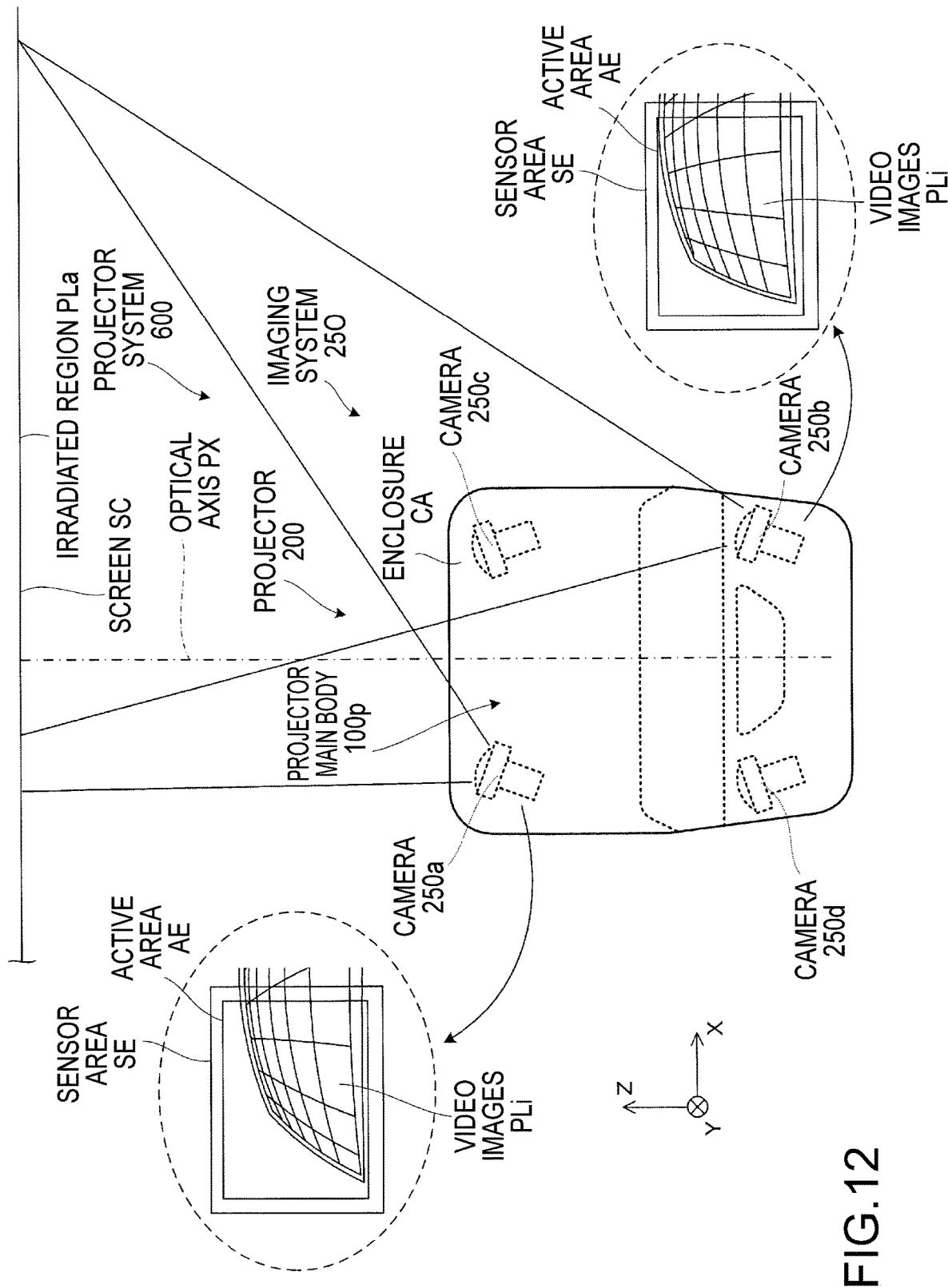
FIG. 12 describes parallax images (stereo images) acquisition performed by a pair of imagers and the imaging ranges thereof.

FIG. 11 shows the attitude of the imaging system 250 in a projector 200, which forms the projector system 600 according to the present embodiment. FIG. 11 corresponds to FIG. 3. FIG. 12 describes the parallax image acquisition performed by a pair of a first camera 250a and a second camera 250b, out of first to fourth cameras 250a, 250b, 250c, and 250d, which form the imaging system 250, and the imaging ranges of the first and second cameras. FIG. 12 corresponds to FIG. 5.

First, unlike in the first embodiment, the optical axes AX1 to AX4 of the first to fourth cameras 250a, 250b, 250c, and 250d are not parallel to the optical axis PX of the projector main body 100p but incline with respect thereto when projected on a plane parallel to the XZ plane, as shown in FIG. 11. Further, the cameras 250a, 250b, 250c, and 250d each incline by a tilt angle that falls within a predetermined angular range, as in the first embodiment.

However, the first camera 250a and the second camera 250b, which are paired with each other, incline by roughly the same amount toward the +X side, which is the imaging range, so that they are parallel to each other when projected on a plane parallel to the XZ plane. Similarly, the third camera 250c and the fourth camera 250d, which are the other pair, incline by roughly the same amount toward the -X side, which is the imaging range, so that they are parallel to each other when projected on a plane parallel to the XZ plane. That is, the cameras 250a, 250b, 250c, and 250d each incline in correspondence with the imaging range of the irradiated region PLa. From a different point of view, the first camera 250a and the third camera 250c, which are located on the side close to the irradiated region PLa, that is, the screen SC, incline inward, and the second camera 250b and the fourth camera 250d, which are located on the side remote from the screen SC, incline outward. It is now assumed by way of example that the optical axes AX1 to AX4 incline by 20° with respect to the optical axis PX when projected on a plane parallel to the XZ plane.

In this case, for example, the first camera 250a and the second camera 250b, which are paired with each other, perform imaging with the cameras slightly inclining, unlike in the first embodiment (see FIG. 5), as shown in FIG. 12. The same holds true for the third camera 250c and the fourth camera 250d.

Figure 13:
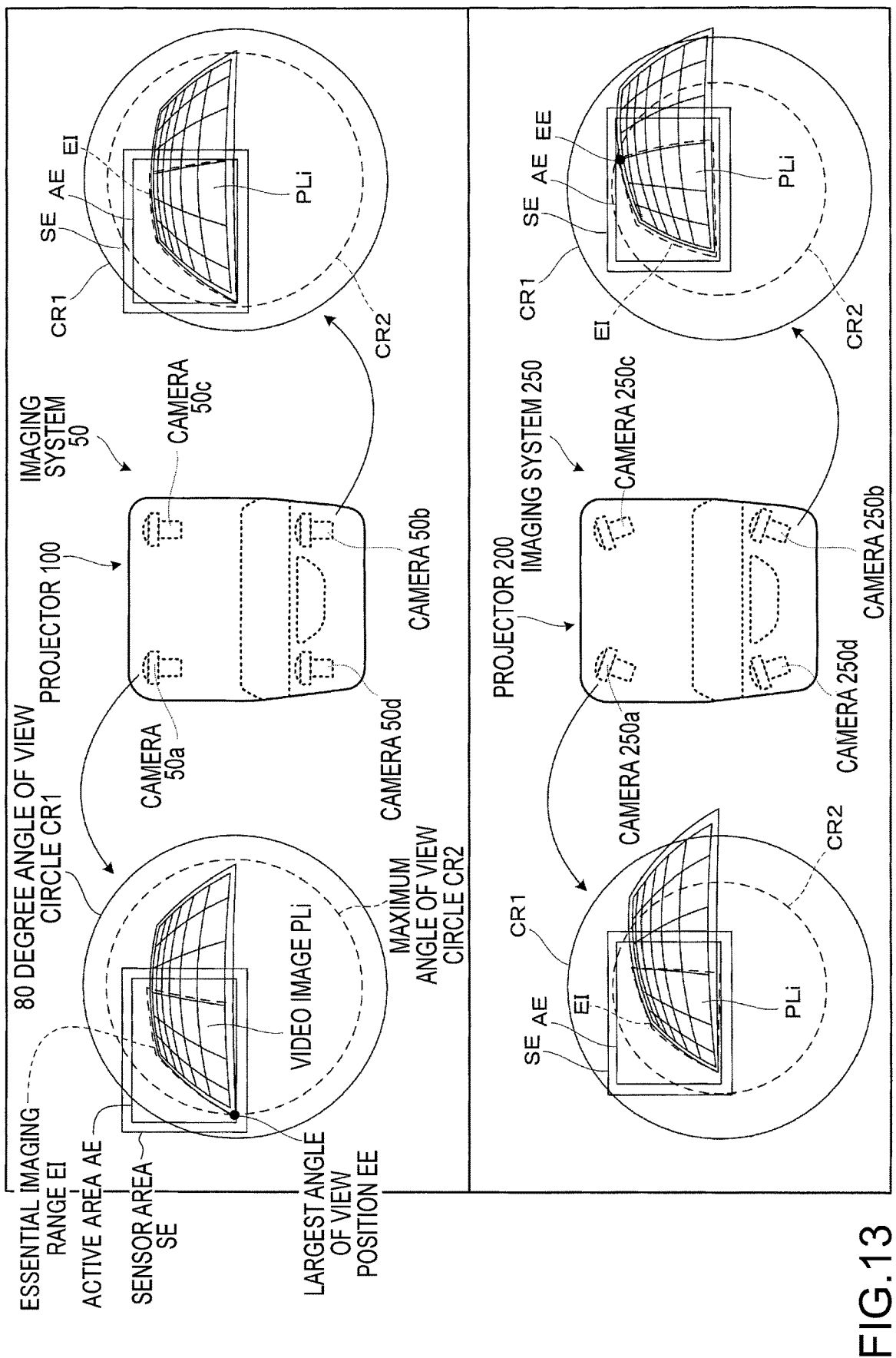
FIG. 13 compares the projector system according to the first embodiment with the projector system according to the second embodiment.

In FIG. 13, the upper portion shows the imaging performed by the first camera 50a and the second camera 50b in the first embodiment, and the lower portion shows the imaging performed by the first camera 250a and the second camera 250b in the second embodiment. FIG. 13 therefore shows comparison between the two types of imaging. In FIG. 13, the solid-line circle CR1 represents a line corresponding to an angle of view of 80 degrees, and the broken-line circle CR2 represents a line representing a necessary maximum angle of view. The circle CR2 is the line representing the angle of view and passing through a position EE where the largest angle of view is required in an essential imaging range EI, which corresponds to half the irradiated region PLa shown in FIG. 13. Comparison between the upper portion and the lower portion of FIG. 13 by using the circle CR1 as a reference shows that the circle CR2 in the lower portion is smaller than the circle CR2 in the upper portion. That is, in the present embodiment, it is shown that the angle of view of each of the cameras can be reduced. It is noted that there is no difference in the minute angles Δθ1 and Δθ2 and the angle θ3, which define the error region ER and the minimum circle MC, which encompasses the error region ER, in the specific configuration example (specific specifications), between the present embodiment and the first embodiment.

The present embodiment, in which the cameras 250a, 250b, 250c, and 250d, which are the four imagers that form the imaging system 250, can capture two sets of parallax images that differ from each other in terms of imaging range, also allows acquisition of parallax information that allows high-accuracy position sensing with the inter-camera distance reduced. As a result, for example, in achieving the interactive image projection by using the parallax information to detect the pointing element on the irradiated region PLa, which is the projection screen, the size of the imaging system can be reduced.

Others

The invention is not limited to the embodiments described above and can be implemented in a variety of other aspects to the extent that they do not depart from the substance of the invention.

In the above description, the imaging systems 50 and 250 can be incorporated as part of the projectors 100 and 200 and may, for example, instead be provided as imagers separate from the projectors 100 and 200.

The above description has been made with reference to the specific configuration example (specific specifications), which is presented only by way of example, and a large variety of other configuration examples are conceivable.

In the above description, a variety of processes are carried out by the projector controller, a PC connectable to the projector 100, and other components, but a process for which each of the projector controller, the PC, and other components is responsible can be changed in a variety of manners. For example, part or entirety of the variety of types of control may be performed by the PC or any other externally connected apparatus (PC or any other apparatus forms projector controller). Conversely, no PC may be provided.

In the above description, the pattern image PT is projected in the calibration by using the pattern image light GL, which is formed of light that belongs to the green wavelength band, but the pattern image PT is not necessarily projected by using light that belongs to the green wavelength band, and it is conceivable to use light that belongs to another wavelength band.

In the above description, illustration and specific description of the light source, the light modulator, the projection system, and other components that form the projector main body 100p are partly omitted, and these components can be configured in a variety of manners. For example, the light source is not limited to the configuration described above, and a high-pressure mercury lamp can, for example, be used and light therefrom can be separated into three light fluxes. The light modulator is not limited to the configuration described above, and it is conceivable to use a liquid crystal panel combined with a color filter, a reflective liquid crystal panel, a digital micromirror device, or any of a variety of other devices.

The entire disclosure of Japanese Patent Application No. 2017-049697, filed on Mar. 15, 2017 is expressly incorporated by reference herein.

What is claimed is:

1. A projector system comprising:
a projector main body that projects image light; and
a first imager, a second imager, a third imager, and a fourth imager that allow two sets of parallax images that differ from each other in terms of imaging range to be captured in a region where the image light from the projector main body is projected, wherein
the first to fourth imagers are disposed at four corners of an enclosure that accommodates the projector main body,
the first and second imagers are disposed in diagonal positions out of the four corners of the enclosure that accommodates the projector main body,
the third and fourth imagers are disposed in diagonal positions out of the four corners of the enclosure that differ from the diagonal positions where the first and second imagers are disposed,
the first and second imagers are configured to capture a first set of parallax images in a first imaging range, and the third and fourth imagers are configured to capture a second set of parallax images in a second imaging range, the first set of parallax images being different from the second set of parallax images, and the first imaging range partially overlapping with the second imaging range, such that there are portions of the first imaging range that do not overlap with the second imaging range,
the first imager is disposed in a position separate in a first direction perpendicular to a projection direction of the projector main body from a projection optical axis of the projector main body,
the second imager is disposed in a position separate in a second direction opposite the first direction from the projection optical axis, and
the first and second imagers differ from each other in terms of a distance to the region where the image light from the projector main body is projected.

2. The projector system according to claim 1,
wherein the third imager is disposed in a position separate in the second direction from the projection optical axis,
the fourth imager is disposed in a position separate in the first direction from the projection optical axis, and
the third and fourth imagers differ from each other in terms of the distance to the region where the image light from the projector main body is projected.

3. The projector system according to claim 2, wherein the first and third imagers are disposed in positions closer to the projection region than the second and fourth imagers.

4. The projector system according to claim 3,
wherein the first to fourth imagers each incline by a tilt angle that falls within a predetermined angular range,
the tilt angle of the first imager is greater than the tilt angle of the second imager, and
the tilt angle of the third imager is greater than the tilt angle of the fourth imager.

5. The projector system according to claim 2, wherein the first and third imagers have the same distance to the region where the image light from the projector main body is projected.

6. The projector system according to claim 2, wherein the second and fourth imagers have the same distance to the region where the image light from the projector main body is projected.

7. The projector system according to claim 2,
wherein the first and second imagers capture images of at least half the region where the image light from the projector main body is projected, and
the third and fourth imagers capture images of at least half the region where the image light from the projector main body is projected, the at least half region containing a remaining region that is not captured by the first and second imagers.

8. The projector system according to claim 2,
wherein the first and second imagers capture images of at least half the region where the image light is projected, the at least half region containing an edge region on a side in one of the first and second directions, and
the third and fourth imagers capture images of at least half the region where the image light is projected, the at least half region containing an edge region on a side in another of the first and second directions.

9. The projector system according to claim 1, wherein the projector main body obliquely projects the image light.

10. The projector system according to claim 1, wherein the first to fourth imagers each incline in correspondence with a range over which the imager captures an image of the region where the image light from the projector main body is projected.

11. The projector system according to claim 1, wherein the first to fourth imagers capture images of imaging regions containing the region where the image light from the projector main body is projected to allow detection of a pointing element present in any of the imaging regions.

12. The projector system according to claim 1, wherein the projector system identifies an image projection position based on image light information acquired by the first to fourth imagers and a position of a pointing element detected by the first to fourth imagers and performs image projection that reflects information on the identified position of the pointing element.

* * * * *